United States Patent [19]

Clark

[11] Patent Number: 4,924,125
[45] Date of Patent: May 8, 1990

[54] ELECTRIC MOTOR OR ALTERNATOR

[75] Inventor: Peter B. Clark, Warkworth, New Zealand

[73] Assignee: Clark Automotive Developments Limited, Warkworth, New Zealand

[21] Appl. No.: 349,939

[22] Filed: May 3, 1989

Related U.S. Application Data

[63] Continuation of Ser. No. 144,386, Jan. 26, 1988, abandoned.

[30] Foreign Application Priority Data

Sep. 15, 1987 [NZ] New Zealand ......................... 221822

[51] Int. Cl.$^5$ ............................................. H02K 7/00
[52] U.S. Cl. .................................. 310/67 R; 310/156; 310/DIG. 6
[58] Field of Search ................... 310/266, 67 R, 67 A, 310/154, 156, 114–116, 68 R, DIG. 6, 254, 261, 184, 179, 180, 43, 207

[56] References Cited

U.S. PATENT DOCUMENTS

| | | |
|---|---|---|
| 1,958,043 | 5/1934 | Heintz . |
| 2,104,707 | 1/1938 | Rawlings . |
| 2,760,127 | 8/1956 | Duncan ......................... 310/DIG. 6 |
| 2,797,376 | 6/1957 | Meade . |
| 3,280,373 | 10/1966 | Dabinett . |
| 3,296,471 | 3/1967 | Cochardt ............................. 310/154 |
| 3,462,626 | 8/1969 | Kluss . |
| 3,531,670 | 9/1970 | Loudon ............................... 310/156 |
| 3,564,306 | 2/1971 | Ott ..................................... 310/67 R |
| 3,667,011 | 4/1972 | Casaday et al. . |
| 3,725,708 | 4/1973 | Possis . |
| 3,818,586 | 6/1974 | Harkness ............................... 29/598 |
| 3,914,629 | 10/1975 | Gardiner . |
| 4,130,769 | 12/1978 | Karube ................................ 310/156 |
| 4,217,508 | 8/1980 | Uzuka ................................ 310/67 R |
| 4,260,920 | 4/1981 | Nakamura et al. . |
| 4,268,769 | 5/1981 | Dorner ......................... 310/DIG. 6 |
| 4,303,843 | 12/1981 | Arnoux .............................. 310/67 R |
| 4,417,167 | 11/1983 | Ishii .................................... 310/67 R |
| 4,418,296 | 11/1983 | Ebentheuer ....................... 310/67 R |
| 4,426,606 | 1/1984 | Suita et al. . |
| 4,438,342 | 3/1984 | Kenyon ................................. 290/45 |
| 4,471,252 | 9/1984 | West ................................... 310/154 |
| 4,636,671 | 1/1987 | Terada .................................. 310/74 |
| 4,638,201 | 1/1987 | Feigel ................................. 310/214 |
| 4,645,961 | 2/1987 | Malsky ................................ 310/254 |
| 4,651,066 | 3/1987 | Gritter ................................ 310/156 |
| 4,665,331 | 5/1987 | Sudo ............................ 310/DIG. 6 |
| 4,692,631 | 9/1987 | Dahl . |
| 4,733,118 | 5/1988 | Mihalko . |

FOREIGN PATENT DOCUMENTS

| | | |
|---|---|---|
| 1538913 | 3/1970 | Fed. Rep. of Germany .... 310/67 R |
| 1613380 | 9/1970 | Fed. Rep. of Germany ... 310/DIG. 6 |
| 2132477 | 1/1972 | Fed. Rep. of Germany .... 310/67 R |
| 2405678 | 8/1975 | Fed. Rep. of Germany ...... 310/266 |
| 3447980 | 3/1986 | Fed. Rep. of Germany ... 310/DIG. 6 |
| 51-20514 | 8/1974 | Japan . |
| 51-65302 | 12/1974 | Japan . |
| 50-144018 | 11/1975 | Japan . |
| 53-46617 | 10/1976 | Japan . |
| 59-92761 | 11/1982 | Japan . |
| WO 2192 | 3/1988 | PCT Int'l Appl. . |
| 1491027 | 11/1977 | United Kingdom . |
| 2059200 | 4/1981 | United Kingdom . |
| 1598122 | 9/1981 | United Kingdom . |

OTHER PUBLICATIONS

Kenjo et al., *Permanent-Magnet and Brushless DC Motors*, Clarendon Press Oxford 1985.
Kenyon, *Energy! Triumph or Tragedy?* Buffalo Press, 1977.

*Primary Examiner*—R. Skudy
*Attorney, Agent, or Firm*—Young & Thompson

[57] ABSTRACT

A permanent magnet rotary dynamo electric machine such as a high speed three phase brushless motor has at least one stator and at least one rotor spaced apart from one another by a cylindrical gap therebetween. A plurality of permanent magnetic poles are provided by a plurality of rare earth magnets positioned side by side on the inside of a cup shaped rotor and oriented parallel to the rotor axis. The stator has a plurality of wound poles of shallow depth which are wound on or close to the surface of a substrate of low magnetic permeability (less than 20 times that of air). The wound poles are positioned adjacent the cylindrical gap so as to intersect the magnetic flux paths between adjacent permanent magnetic poles.

6 Claims, 10 Drawing Sheets

ELECTRIC MOTOR OR ALTERNATOR

This application is a continuation of application Ser. No. 07/144,386, filed 2/16/88 now abandoned.

FIELD

This invention relates to permanent magnet rotary dynamo electric machines of the type in which relative rotation occurs between a plurality of permanent magnetic poles and a plurality of wound poles. The wound poles being wound in the sense that they have associated therewith electric current carrying conductors. "Permanent magnetic poles" are generally provided by high strength permanent magnets formed of ceramic ferrites or rare earth magnets but they can also be provided by single or multi-turn closed loop(s) superconductors were the magnetic poles are permanent so long as the conductor is energised and remains in a superconducting state. The term "permanent magnet rotary dynamo electric machines" includes both motors and generators of direct or alternating current, and thus includes direct current generators as well as alternators.

PRIOR ART

Electric motors and generators/alternators have traditionally been constructed in coaxial cylindrical formation with a central rotor having a plurality of wound poles formed by windings on steel laminations or on a soft iron core. The stator is a cylindrical casing surrounding the rotor, and requires accurate construction as there is only a narrow cylindrical gap between the rotor and stator of typically less than 0.25 mm for small machines, less than 5 kw. The stator also has a plurality of wound poles formed by windings in laminations inside a steel casing. Such silicon steel laminations generally have a high magnetic permeability of the order of 2000 (relative to air). Magnetic permeability of a material is conventionally expressed as a numerical value showing how many times it is greater than the magnetic permeability of air.

In the case of synchronous and universal motors the connections to the rotor are by way of a commutator and brushes or slip rings and brushes which are prone to wear. These traditional electric motors, and to a lesser extent alternators, suffer from problems arising from the use of iron in the wound poles in either the rotor, stator, or more typically both. The iron imposes a frequency limitation, typically a DC electric motor is limited to an internal operating frequency of no more than 500 hertz, because of the induced eddy current losses arising arising from the iron present.

For example the small high speed electric motors used in vacuum cleaners may run up to 30,000 rpm (ie 500 hertz) but are limited to operation of about one hour at a time because of eddy current heating problems associated with the iron laminations associated with the wound poles of both stator and rotor. In order to achieve these high speeds, within the frequency limitations imposed by the iron laminations they use only 2 brushes. If the number of brushes were increased there would be much greater losses, as well as greater complexity in the circuit used to control the motor.

Attempts have been made to build permanent magnet rotary dynamo electric machines of similar coaxial cylindrical configuration but using generally conventional constructional techniques so that there is a narrow air gap between permanent magnets on an outer stator and the wound poles are wound in the iron laminations of an internal rotor. The following U.S. patents show examples of permanent magnet machines:

| | |
|---|---|
| 1,958,043 | Heintz, 1934 |
| 2,104,707 | Rawlings, 1938 |
| 3,296,471 | Cochardt, 1967 |
| 3,531,670 | Loudon, 1970 |
| 3,564,306 | Ott, 1971 |
| 3,818,586 | Harkness et al, 1974 |
| 4,303,843 | Arnoux et al, 1981 |
| 4,417,167 | Ishii et al, 1983 |
| 4,471,252 | West, 1984 |
| 4,636,671 | Terada, 1987 |
| 4,638,201 | Feigel, 1987 |
| 4,651,066 | Gritter et al, 1987 |

All of these patents show motors/alternators utilising permanent magnets of different configurations. The oldest patent shows a magneto, the Rawlings patent shows a bicycle generator, and the others show various motors/alternators, mostly with permanent magnets aligned with their axes parallel to the rotor shaft. The West patent shows a permanent magnet starter motor having a conventional laminated (iron) wound rotor and only 4 arcuate permanent magnets. This patent is concerned with shields for the permanent magnets positioned on the inside of the surrounding stator so as to prevent demagnetization of the corners of the magnet. The other U.S. patents listed above show motors having between 4 and 12 permanent magnets all having conventional laminated iron rotors with wound poles wound in slots in the laminations.

These constructions all suffer from the same eddy current and hysteresis losses because of the need for iron laminations associated with the wound poles.

OBJECT

It is an object of this invention to provide an improved permanent magnet rotary dynamo electric machine, or one which will at least provide the public with a useful choice.

STATEMENT OF INVENTION

In one aspect the invention provides a permanent magnet rotary dynamo electric machine including a permanent magnet rotary dynamo electric machine including: at least one cylindrical stator and at least one external cylindrical rotor rotatable about an axis and having an interior cylindrical surface surrounding said stator and spaced apart therefrom by a cylindrical gap, a plurality of permanent magnetic poles on said interior surface of the rotor and closely spaced around the interior circumference of the rotor and positioned adjacent said cylindrical gap, said stator having a plurality of wound poles on or in a substrate with said wound poles being positioned adjacent said cylindrical gap, wherein the configuration of the closely spaced permanent magnetic poles about the rotor is such that there are relatively short magnetic flux paths between circumferentially adjacent permanent magnetic poles, said relatively short magnetic flux paths extending in a region intersected by said stator, said region and the substrate of the stator having both a low relative magnetic permeability and being substantially non-conducting.

Preferably there are a relatively high number of poles on both the rotor and the stator of a rotor/stator pair so as to create a correspondingly short magnetic flux path between adjacent permanent magnetic poles. In most cases a single rotor/stator pair will sufficient although this invention can be applied to multiple rotor/stator pairs.

It is also preferred that the wound poles are of shallow depth and are wound on or close to the surface of the substrate. The substrate can be made of any material having a low magnetic permeability e.g. wood, fibreglass, plastics, plastics resins, or in some cases ferrites. Preferably the magnetic permeability of the substance is below 20 (relative to air). The wound poles could be wound on a removable mould and encapsulated within a plastics resin so that the resin forms the substrate.

Preferably the wound poles are provided on or close to the outer cylindrical surface of a stator so that the permanent magnetic poles are provided on the inner surface of a surrounding cup shaped rotor.

Where the permanent magnetic poles are to be positioned on the inner face of a rotating outer cylinder, it would be generally convenient to use a plurality of high strength bar magnets such as ceramic or rare earth magnets, mounted adjacent one another with their axes parallel to the axis of the rotor. By mounting them on the inside of the rotor, it is possible to withstand greater rotational speeds than would be possible with the magnets on the outside surface of the rotor.

Preferably, the cylindrical gap between the rotor and stator is greater than that used with conventional electric motors or conventional generators/alternators which require the presence of iron within the stator in order to provide a magnetic flux path in the stator.

DRAWINGS

Other aspects of this invention, which should be considered in all its novel aspects, will become apparent from the following description, which is given by way of example only, with reference to the accompanying drawings in which:

FIG. 4 shows a three phase winding construction for a typical permanent magnet rotary dynamo electric machine of this invention.

Figure 1A:
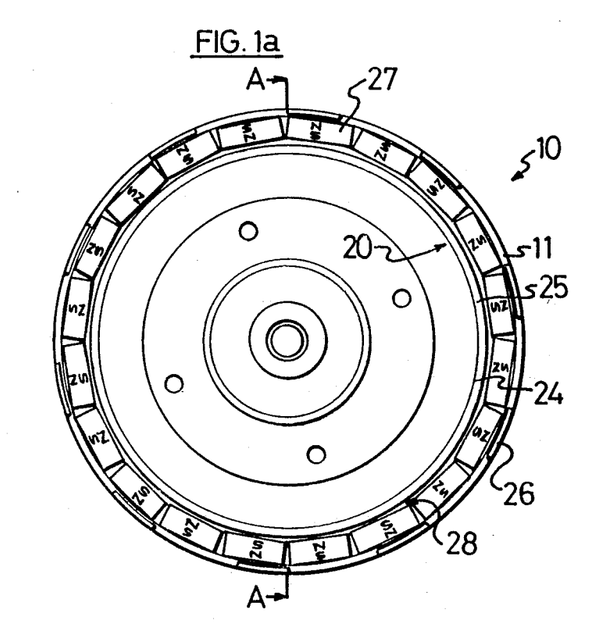
FIG. 1a: is a drive end view (with mounting plate removed) for a permanent magnet rotary dynamo electric machine showing the external rotor construction using bar magnets.

The motor/alternator of this invention is preferably constructed using a series of adjacent bar magnets inside a steel annulus to form the rotor as shown in FIG. 1a. The steel annulus provides two important functions:

1. A mechanical support for the magnets against the high centrifugal forces encountered when the rotor is running at high rpm. It will be apparent that ceramic and rare earth magnets have a low tensile strength when compared to the steel cup shaped rotor of FIG. 1b.

Figure 2A:
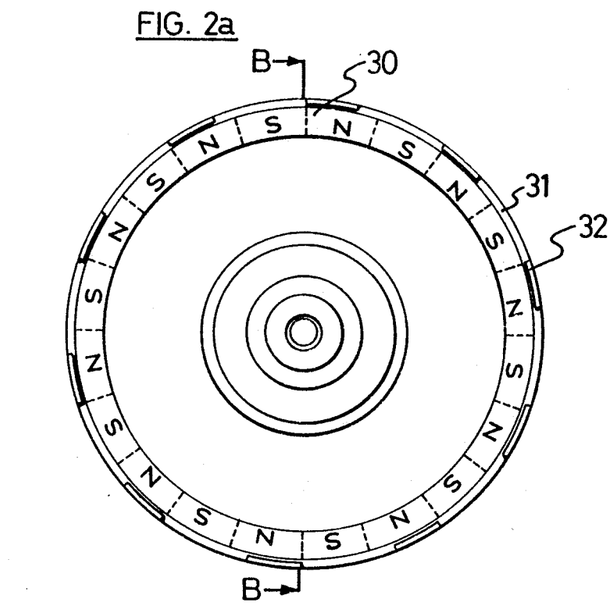
FIG. 2a: shows the drive end view of a permanent magnet rotary dynamo electric machine having an external rotor formed from a one piece ring magnet. (The stator construction has been omitted from this drawing.)

2. A return path for the magnetic flux between adjacent magnets. The bar magnets could equally well be replaced by a cylindrical "ring" magnet, as shown in FIG. 2a, with alternate north and south poles around its circumference.

In the following examples, it is most convenient to provide the permanent magnets on the rotor so that electrical connections can be readily made to the wound poles on the stator. Such a construction can be referred to as an iron-less stator motor/alternator. Other configurations are possible. For example, if the co-axial iron-less direct current motor construction is controlled by carbon brushes and a commutator, it would then have the magnets stationary (stator) and the windings and commutator turning (rotor) and thus would have an ironless rotor rather than an ironless stator.

If the co-axial iron-less stator direct current motor is controlled by electronic means, the construction would follow, see FIGS. 1a, 1b and 1c or FIGS. 2a and 2b, and therefore the magnets would turn (rotor) and windings would be stationary (stator).

Figure 5A:
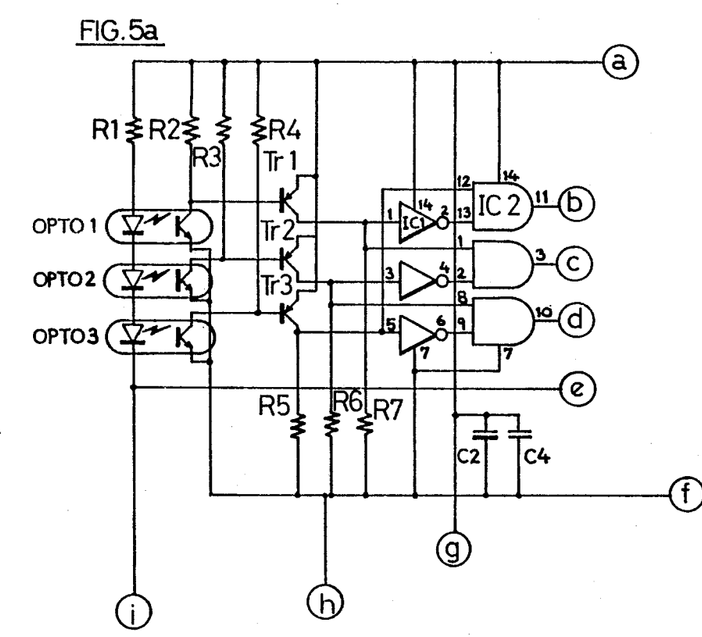
FIGS. 5a, 5b, 5c: show three segments of a circuit diagram for the operation of a three phase motor constructed in accordance with FIGS. 1a/1b using direct current supply.
Figure 5B:
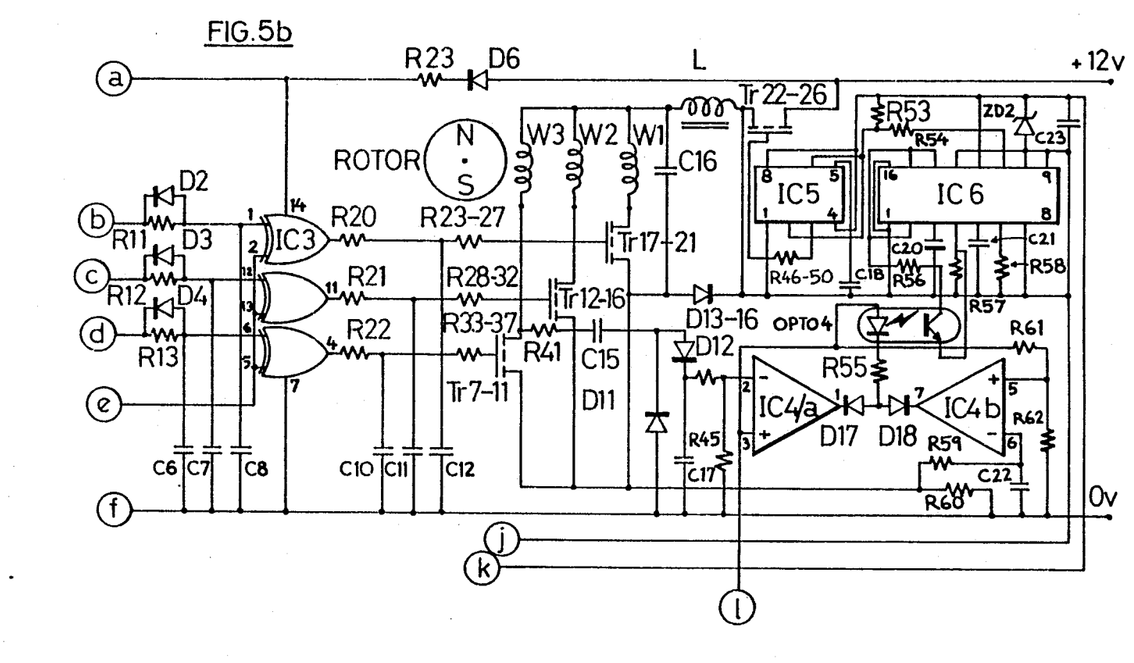
Figure 5C:
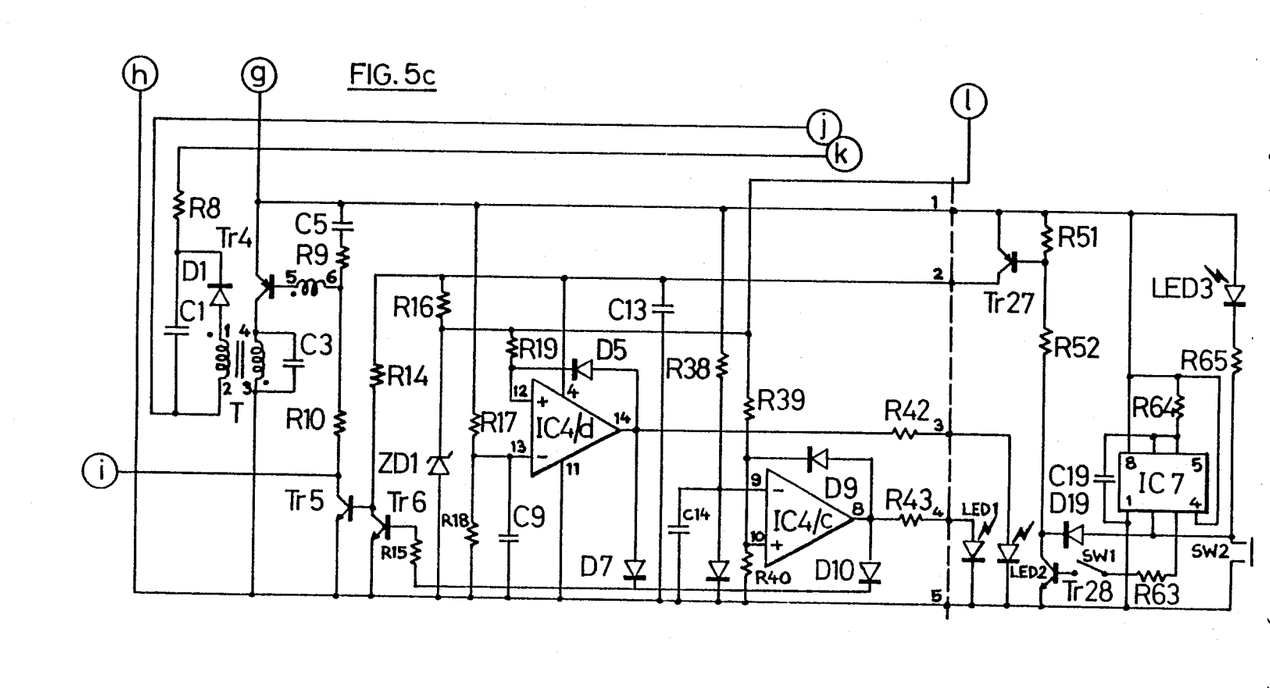

Slotted optical switches have been used in the following examples to accurately sense position of the rotor and control transistors to switch direct current into the three phase stator windings, see FIGS. 3a, 3b, 5a, 5b, 5c and 6. The rotor has a series of protrusions, one per magnetic pole pair and 120 degrees electrical to allow sequential current injection into the stator windings. Three optocouplers are used with logic gates to provide drive signals to the transistors, as shown in FIGS. 5a, 5b, 5c. Also non-overlap logic is used, so that only one winding at a time has current flowing in it. Two or more phases could be used if desired, but generally three phases gives optimum efficiency with current conduction of 120 electrical degrees per phase.

Figure 1B:
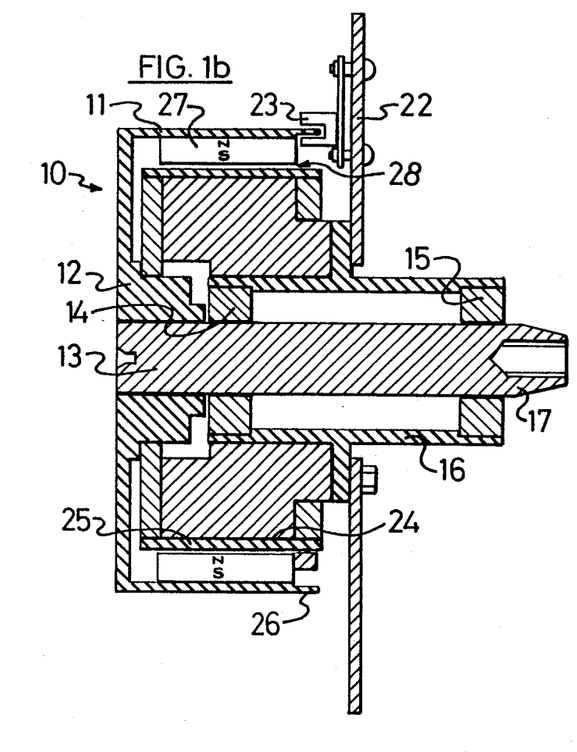
FIG. 1b: is a section on line AA of FIG. 1, (with mounting plate in position), showing the placement of the bar magnets in the outer rotor, and the relative position of the stator within the rotor.
Figure 1C:
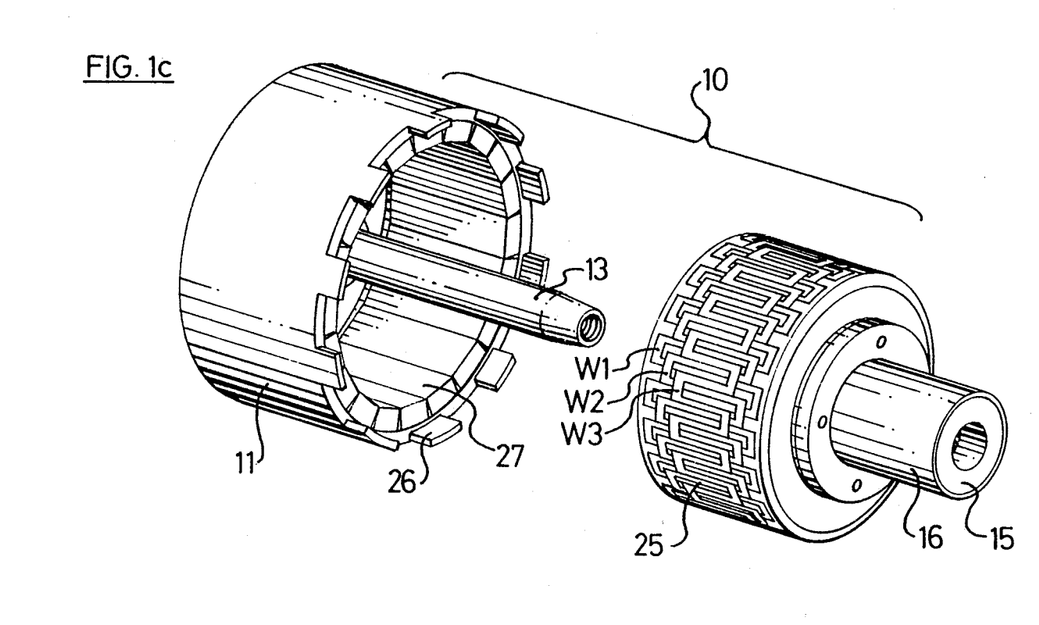
FIG. 1c: is a perspective view of the separated stator and rotor of FIGS. 1a and 1b, illustrating the three phase stator winding of FIG. 4 on the exterior of the stator, and with mounting plate omitted from the stator.

EXAMPLE 1—FIGS. 1a AND 1b AND 1c

In this example, a co-axial motor or alternator is illustrated, having an external rotor construction utilizing bar magnets. Whether the unit is used as a motor or an alternator will depend upon the application required, and whether or not current is extracted from these from the stator windings, or whether current is supplied to the stator windings to operate the unit as a motor.

Preferably the motor/alternator 10 has a cylindrical sleeve 11 which is conveniently in the form of a cup having an end face 12, which is attached to a central shaft 13. This shaft is preferably mounted within bearings 14, 15 mounted within a stator 16. Conveniently, the shaft has a tapped end 17 for connection to other machinery.

Preferably, the inner face 20 of the sleeve 11 is provided with a plurality of side by side bar magnets 27, aligned with their axes parallel to the axis of the rotor. It will be appreciated that there will be an even number of such closely spaced magnets, so that the polarity of the permanent magnetic poles alternates as one travels around the inner circumference presented by these magnets.

The magnets are preferably rare earth or ceramic bar magnets, and 20 such magnets are shown in FIG. 1A, for the purpose of illustration. Any even number of such magnets can be used depending upon design criteria such as size, weight, price, availability and frequency.

Preferably the bar magnets are formed from either rare earth or ceramic magnets, and have a high field strength enabling them to provide a higher magnetic flux across a much wider air gap than is possible with conventional magnets, but at the same time it is preferred that the adjacent permanent magnetic poles are close preferred that the adjacent permanent magnetic poles are close together to provide a short magnetic flux path between adjacent magnetic poles.

Preferably, the rotor sleeve and end face, are formed of steel although other materials could be used.

The stator 16 is preferably connected to a mounting plate 22, which may also support slotted optical switches 23 (only one of which is shown) in order to detect the position of the magnets. The slotted on the end face of the sleeve, which protrusions 26 may be associated with magnetic poles of a particular polarity.

Figure 3A:
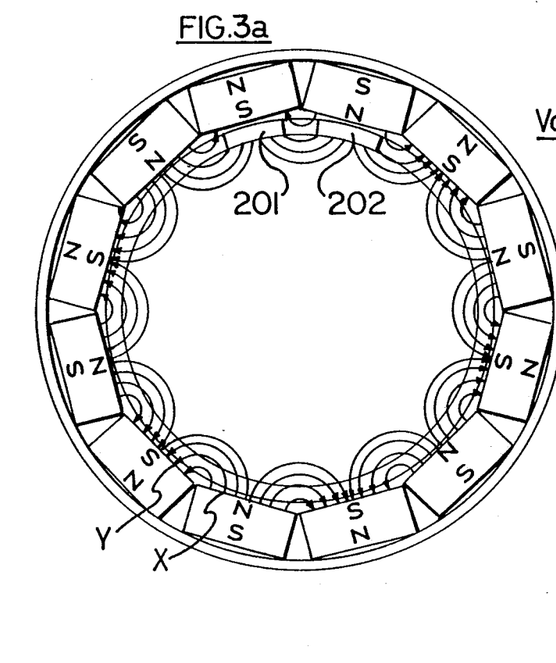
FIG. 3a: shows a flux diagram for a typical permanent magnet rotary dynamo electric machine of this invention.

It is preferred that the rotor and a stator are spaced apart by a relatively large cylindrical air gap 28 of the order of 0.25 mm to 1.5 mm and preferably 0.75 mm for the 20 pole motor/alternator of this example. This enables the wound poles to intersect the magnetic flux path as shown in FIG. 3a. The air gap is preferably less than the depth of the magnets and should be of such a size as to allow for normal engineering clearances and tolerances.

The stator has an annular generally cylindrical substrate 24 of low magnetic permeability material with a plurality of wound poles 25 on its outer cylindrical surface. A preferred substance is glass reinforced plastics as this can be formed into a sufficiently rigid cylindrical surface which on a prototype machine without a fan has not distorted in use. The number of wound poles correspond to the number of permanent magnetic poles inside the rotor. The wound poles are relatively shallow in that they are formed on or close to the surface of the substrate (unlike conventional wound poles which are wound within slots formed in steel laminations). The depth of the wound poles on or close to the surface of the stator will depend upon the size of the stator and required rating of the motor. In the example shown, the depth would be of the order of 1 mm to 10 mm, and preferably about 3 mm.

It will be generally convenient to provide the wound poles as wave windings on that surface of the stator facing the permanent magnetic poles. For example FIG. 4 shows the wave windings W1, W2, W3 each providing a plurality of wound poles 201-211, 201A-211A, and 201B-211B on the surface of a substrate for a three phase stator winding as used in the motor/alternator of FIGS. 1a/1b. As will be discussed below a three phase winding is preferred for most applications but other phases have their uses for particular applications. They may be exposed to the air on encapsulated in a plastic resin of low magnetic permeability.

The wound poles may be provided in a variety of forms and may provide for one or more phases. As the substrate is of low magnetic permeability there is consequently no iron (at least in the outer portion of the substrate) to provide a magnet flux path in the stator. The wound poles on the surface of the stator are so positioned as to intersect the magnetic flux lines connecting adjacent ceramic magnets as the flux lines essentially form a series of loops from one magnet to the next as one travels around the inner circumference of the rotor. This is shown in FIG. 3a which illustrates the relative position of two wound poles say 201 and 202 of wave winding on the surface of the stator and the relatively short magnetic flux paths between adjacent permanent magnetic poles on the rotor which intersect an outer annulus on the stator containing the wound poles.

Figure 3B:
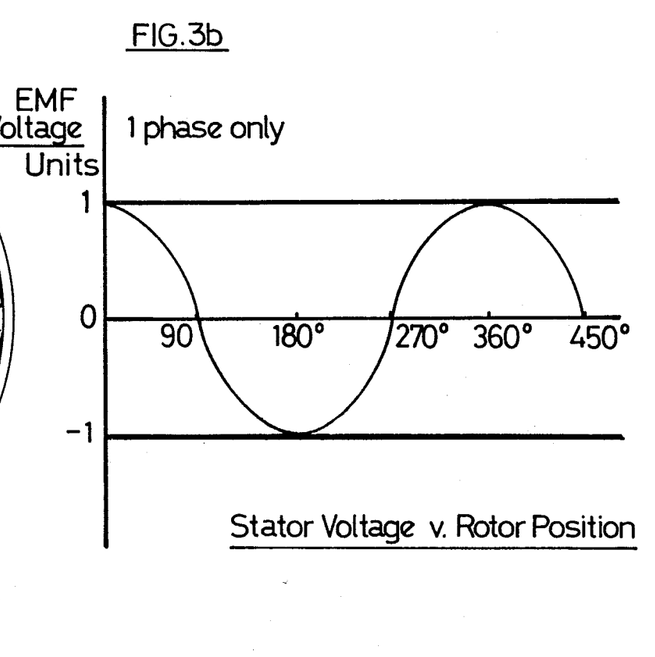
FIG. 3b: shows a voltage graph for a typical permanent magnet rotary dynamo electric machine of this invention.

It is preferred that the average length of the magnetic flux path depicted as a series of semi-circles in FIGS. 3a (eg from point 'X' to point 'Y') is of the order of 16 mm when the air gap between stator and rotor is 0.75 mm and the depth of the wound poles is about 3 mm. The average magnetic flux path length between adjacent permanent magnetic poles will be shorter than the average flux path length in a conventional synchronous motor where the path length is determined primarily by the size and geometry of the steel laminations surrounding the wound poles FIG. 3b shows the stator voltage for different rotor positions for one phase only of the three phase stator windings of the motor/alternator of FIG. 1a and 1b.

ELECTRONIC COMPONENT PARTS LIST—FIGS. 5a, 5b, 5c

The circuit diagram of FIGS. 5a, 5b, 5c is shown on three separate sheets for convenience. The letters shown in circles, eg a-k show how the components of FIG. 5a connect to the components both of FIG. 5b and FIG. 5c. For convenience the drawing of FIG. 5a should be laid out to the left of the drawing of FIG. 5b, and the drawing of FIG. 5c should be placed in a position below that of FIGS. 5a and 5b. These three drawings 5a-5c have the following components.

1. Semiconductors

| D1-D12 | Diode | IN4148 | 75 v | 0.2 A |
|---|---|---|---|---|
| D13-D16 | Diode | BYV42-50 | 50 v | 30 A |
| D17-D19 | Diode | IN4148 | 75 v | 0.2 A |
| ZD1 | Zener Diode | | 5.6 v | 1 W |
| ZD2 | Zener Diode | | 15 v | 1 W |

LED1-LED3 Light emitting diode, 3 mm, green high efficiency

| Tr1 Tr1-Tr4 | Transistor | BC640 | 100 v | 1 A |
|---|---|---|---|---|
| Tr5 + Tr6 | Transistor | BC639 | 100 v | 1 A |
| Tr7-Tr26 | Transistor | BUZ11 | 50 v | 30 A |
| Tr27 + Tr28 | Transistor | BC639 | 100 v | 1 A |
| OPTO1-OPTO3 | Slotted Optical Switch | | OPB 865 T51 | |
| OPTO4 | Optoisolator | | 4N25 | |
| IC1 | Hex inverter | | CD4069 | |
| IC2 | Quad And | | CD4081 | |
| IC3 | Quad Exclusive Or | | CD4070 | |
| IC4 | Quad Op - amp | | LM324 | |
| IC5 | Driver | | NE555 | |
| IC6 | PWM | | TL494 | |
| IC7 | Timer | | TLC555 | |

2. Capacitors

| C1 + C2 | 0.1 | micro-farad | 50 v |
|---|---|---|---|

-continued

|  |  |  |  |
|---|---|---|---|
| C3 | 0.01 | micro-farad | 50 v |
| C4 | 10 | micro-farad | 16 v |
| C5–C8 | 0.01 | micro-farad | 50 v |
| C9–C15 | 0.1 | micro-farad | 50 v |
| C16 | 6.8 | micro-farad | 50 v |
| C17–C19 | 0.1 | micro-farad | 50 v |
| C20 | 10 | micro-farad | 16 v |
| C21–C23 | 0.1 | micro-farad | 50 v |

3. Resistors

|  |  |  |
|---|---|---|
| R1 | 220 | ohms |
| R2 – R4 | 1 | kohms |
| R5 – R7 | 10 | kohms |
| R8 | 390 | ohms |
| R9 | 220 | ohms |
| R10 – R15 | 10 | kohms |
| R16 | 560 | ohms |
| R17 | 220 | kohms |
| R18 | 330 | kohms |
| R19 | 10 | kohms |
| R20 – R22 | 1 | kohms |
| R23 – R38 | 10 | kohms |
| R39 | 120 | kohms |
| R40 + R41 | 10 | kohms |
| R42 + R43 | 330 | ohms |
| R44 | 100 | kohms |
| R45 | 100 | kohms |
| R46 – R50 | 56 | ohms |
| R51 – R53 | 10 | kohms |
| R54 | 3.3 | kohms |
| R55 | 1 | kohms |
| R56 + R57 | 10 | kohms |
| R58 | 1.2 | kohms |
| R59 | 10 | kohms |
| R60 | 300 | micro-ohms |
| R61 | 100 | kohms |
| R62 | 560 | ohms |
| R63 | 10 | kohms |
| R64 | 2.2 | M-ohms |
| R65 | 390 | ohms |

4. Transformer

|  |  |  |  |
|---|---|---|---|
| U15 core. | Winding | 1–2 | 60 turns |
|  | Winding | 3–4 | 40 turns |
|  | Winding | 5–6 | 10 turns |

5. Inductor

|  |  |  |  |
|---|---|---|---|
| U25 core. | 4 turns | 3 mm | air-gap |

6. Switches

|  |  |  |  |
|---|---|---|---|
| SW1 | "on" | switch | SPST |
| SW2 | "Power" | switch | Momentary on |

OPERATION: 12 VOLT DC ELECTRONIC CIRCUIT DIAGRAM—FIGS. 5a, 5b, 5c

Figure 6:
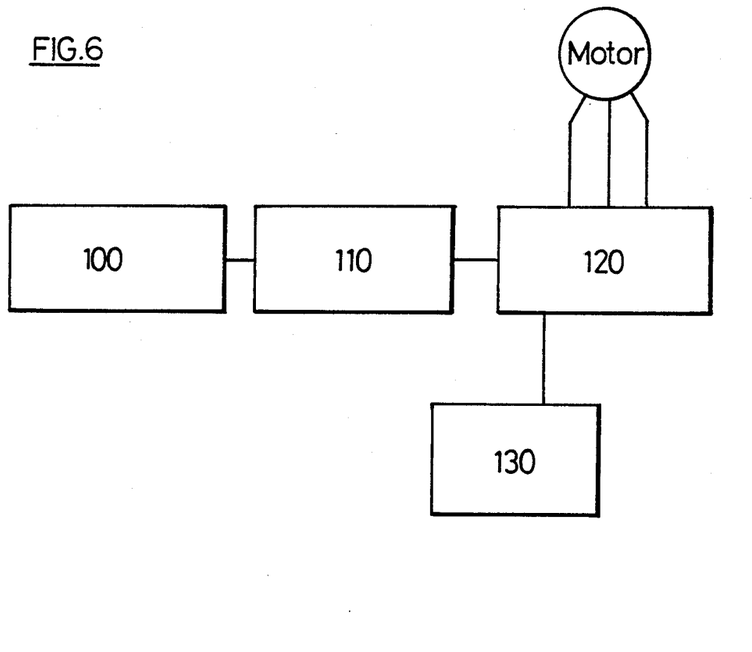
FIG. 6: is a block diagram for the motor operation of FIGS. 1a/1b using direct current supply.
Figure 6A:
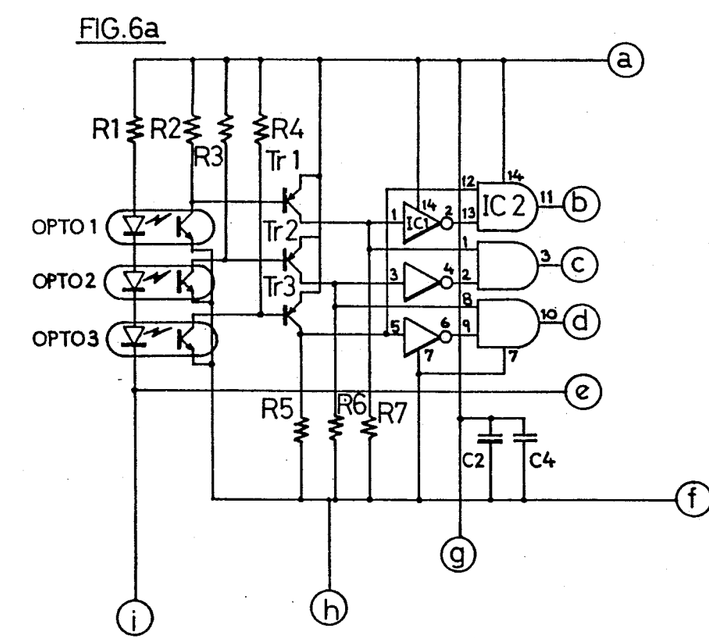
Figure 6B:
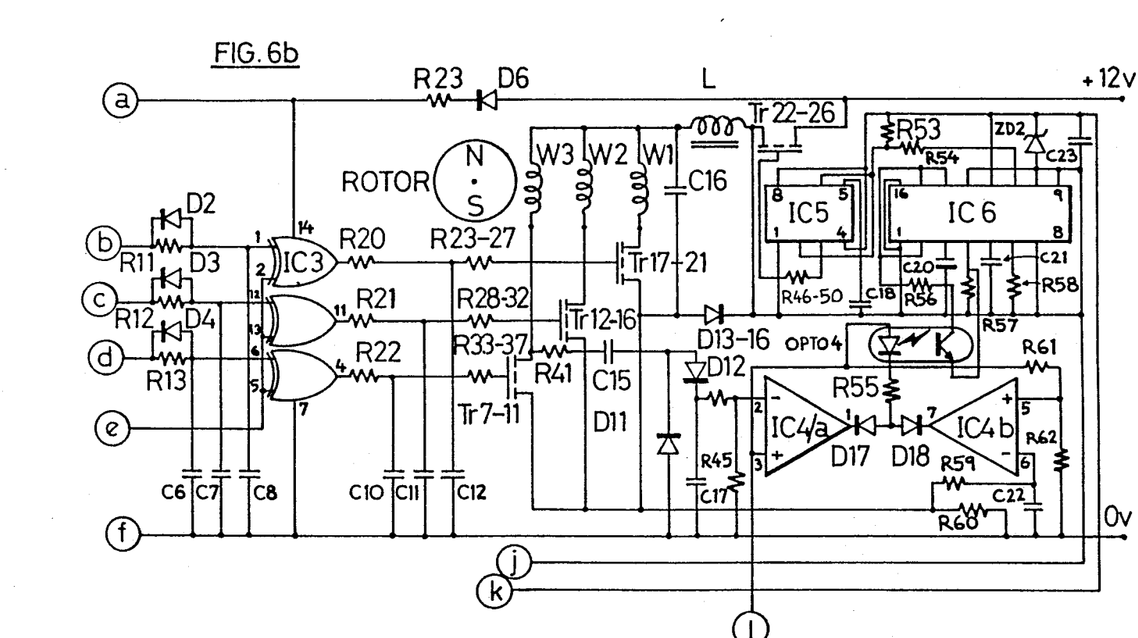

The operation of a three phase motor as shown in FIGS. 1a/1b will now be described with reference to FIGS. 5a, 5b, 5c and 6. The block diagram of FIG. 6 shows the relationship of the following subsystems relative to the motor:
100—the rotor position sensing means (provided by the slotted optical switches).
110—pulses width modulation means for starting and speed control.
120—power transistors and resistive braking means
130—general control means for
on/off starting control
low voltage shut-down
high temperature shut-down
motor turning indication.

The motor position is sensed by the slotted optical switches OPTO1-OPTO3 and this information is converted by logic into three 120 degree non-overlapping signals to control the power transistors. The power transistors Tr17-21, Tr12-16 and Tr7-11 are connected to each of the three phase windings on the stator of the co-axial motor.

When the power transistors Tr17-21 are switched 'on' by the control logic, current flows through winding W1 which magnetically attracts the rotor, which if free to move, turns 120 electrical degrees. After the rotor has turned through 120 electrical degrees, transistors Tr17-21 are switched off and transistors Tr12-16 are switched on. After the rotor has turned a further 120 electrical degrees transistors Tr12-16 are switched off and transistors Tr7-11 are switched on. After the rotor has turned a further 120 electrical degrees transistors Tr7-11 are switched off and transistors Tr17-21 are switched on again completing the cycle.

At starting the input current is only limited by the resistance of the circuit because there is no back EMF voltage produced, as the rotor is stationary. The starting current can be reduced to an acceptable level by using pulse-width modulation techniques (PWM). IC6 is a pulse-width modulation device which can govern the rpm and maximum input current to the motor by varying the pulse width of a series choke DC-DC converter formed by inductor L and Transistors Tr22–Tr26.

Motor input current limitation is achieved by sensing the voltage drop across resistor R60, which IC6 senses via IC4/b and OPTO4 and limits the pulse-width to provide current limiting.

Motor rpm governing is achieved by rectification of the AC voltage generated in winding W3 and sensing of this voltage by IC6 via IC4/a and OPTO 4 to provide a pulse-width of suitable duty cycle.

Rotor position is sensed by slotted optical switches, OPTO1–OPTO3 which detect 120° C. electrical degree protrusions 26 on the rotor. IC1 and IC2 provide non-overlap logic so that only one winding at a time has current flowing in it. Also a time delay in switch-on resistors R11, R12 and R13 and capacitors C6, C7 and C8 provides additional 'dead-time' to allow current flowing in the previous motor winding to reduce to zero before the next winding has current flowing in it.

IC3 provides the logic necessary for th electronic brake. While the motor is switched on the main power transistors Tr7-Tr21 are turned on and off sequentially under the control of the optical slotted switches OPTO1–OPTO3. The motor can be switched off by three different means:
1. Switch SW1 turned off under control of the operator.
2. Low battery voltage causes IC4/d to 'latch-up' and turn off the motor.
3. High temperature on the motor windings or main power transistors causes IC4/c to 'latch-up' and turn off the motor.

When the motor is turned off IC3 turns on all the power transistors, on the three motor windings. This applies a short-circuit between all three windings, which stops the motor turning in 1-2 seconds, providing a useful braking action for the motor.

As an added safety device IC7 and switch SW2 provide a three second enabling period during which switch SW1 must be operated to allow the motor to start.

ROTOR POSITION CONTROL

The three phase motor of FIGS. 1a/1b utilises slotted optical switches to provide rotor position information to control the point of switching of current into the motor windings. Due to the 120 electrical degree conduction angle technique used for this design, there exists other alternatives for accurately sensing rotor position. This is due to the 240 electrical degree period in which the voltage across the motor windings is purely the back EMF voltage generated by the action of the rotor turning.

By differentiating the waveform of winding W2 during the 240 electrical degree non-conducting angle period, it is possible to produce an accurate signal to indicate the point at which current should start to flow in say wound pole 201 of winding W1 and stop flowing in wound pole 201B of winding W3. Also wound pole 201B of winding W3 can indicate the point at which current should start to flow in wound pole 201A of winding W2 and stop flowing in wound pole 201 of winding W1. This applies to all the wound poles of the wingings so that in general, winding W1 can indicate the point at which current should start to flow in winding W3 and stop flowing in winding W2. This can be used for accurate stepper motor control by switching the different windings to provide incremental movement.

Another method of determining rotor position from the back EMF of the motor windings is by sensing the crossing points of the three voltage waveforms and using this information to determine when to switch "on" and "off" the appropriate winding.

Magnetic sensors such as Hall Effect devices can be used in place of the optical slotted switches especially in dusty environments where problems with fully enclosing the motor exist.

Also provided with the electronic design are the following features:

(1) Low voltage shut-down, if battery powered then to avoid harmful over-discharge of the battery, the electronics switches off the motor current, if the battery voltage drops below 10.5 volts.

(2) Thermal shut-down, if the windings, or power transistors overheat then the electronics switches off the motor current.

(3) Current limiting to limit torque and starting current.

Figure 2B:
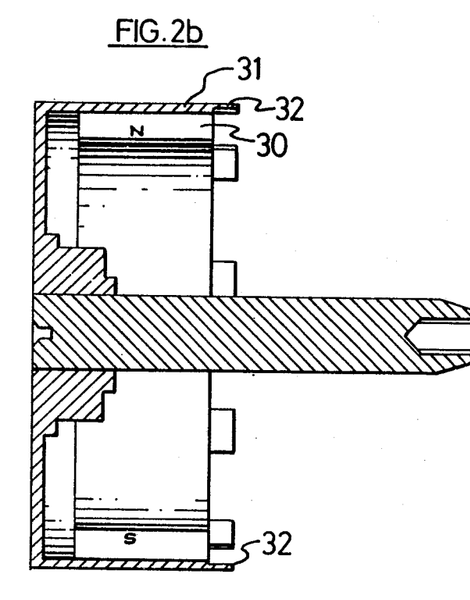
FIG. 2b: is a section on line BB of FIG. 2a, showing the construction of the rotor only.

EXAMPLE 2—FIGS. 2a AND 2b

This arrangement is similar to that of example 1 except that a single cylindrical ring magnet 30 is provided on the inside of the cup shaped rotor 31. Similar protrusions 32 are provided around the edge of the rotor to identify the positions of the permanent magnetic poles of the ring magnet to a slotted optical switch as shown in FIG. 1b. The stator (not shown) can be the same as that of FIG. 1b.

ADVANTAGES OF THE PREFERRED MACHINES OF THIS INVENTION

1. As there are no steel laminations used in the stator, there are no 'eddy-current' and hysteresis frictional losses. This allows for higher efficiency a part or low loading of the machine.
2. As there are no steel laminations used in the stator, there is no saliency "break-out" torque normally associated with permanent magnet machines. This is important in areas where low-speed torque is low and might not be sufficient to allow the machine to start.
3. Very low self inductance of the stator windings due to the large air-gap between alternate magnet poles allows good output regulation of voltage if rpm held constant. This also allows very simple control by transistors in the motor application.
4. Very high power to weight ratio when compared to equivalent induction motors and "universal" brush motor and gives a definite weight saving (as there is no iron in the stator).
5. Electronic control allows a reduction of starting current to any desired level; existing electric motors generally draw five to ten times their normal rated current during starting.

DIFFERENT PHASES

In the above examples a three phase motor/alternator is described but other phase windings may be used, and in particular 1,2 and 4 phase configurations will now be described.

SINGLE PHASE CO-AXIAL MOTORS/ALTERNATORS

1. Single phase co-axial alternators are the most simple configuration of stator for this machine and can find uses where simplicity of construction outweighs absolute output power. The three phase equivalent produces twice the output power for the same resistive losses, and 50 percent additional copper in the stator windings.
2. Single phase co-axial motors are the most simple configuration of stator for this machine, but required some means of starting (similar to single phase induction motors) and therefore require an additional winding or mechanical means to ensure starting. In areas of low starting torque requirements i.e. direct coupled fans there could be a use for single phase motors.

TWO PHASE CO-AXIAL MOTORS/ALTERNATORS

1. Two Phase Co-axial Alternators. This machine provides a 40% increase in output power for the same resistive losses of a single phase machine.
2. Two Phase Co-Axial Motors. Due to two phase operation there are no starting problems, but if the machine is to be electronically controlled from a direct current supply then efficiency could be low if 180 degree current injection is used. The two phase motor could be electronically controlled to provide the 180 degree current injection just for starting and reduce to 120 degrees or less for normal running operation.

THREE PHASE CO-AXIAL/ALTERNATORS

1. Three Phase Co-axial Alternators. This machine provides an increase in output power for the same resistive losses as a single or double phase machine. If the three phase machine uses the same amount of copper as a two phase machine and the stator windings of both machines occupy the full 360° available, then the three phase machine can produce a further 7% output power over the two phase machine for the same resistive losses (ie 47% increase over the single phase machine).

2. Three Phase Co-Axial Motors. Due to three phase operation there are no starting problems, and the machine can easily be electronically controlled from a direct current supply as described with reference to FIG. 6. Due to the 120 degree split with three phase operation sufficient back EMF voltage exists over the 120 degrees to provide efficient current injection from a direct current supply, and this design allows for accurate control of the rotor position, e.g. for a stepper motor.

GREATER THAN THREE PHASE CO-AXIAL MOTORS/ALTERNATORS

1. Co-axial Motors. Slightly higher efficiency possible due to possible smaller current injection angle. The four phase motor has possible applications, due to simplicity of electronically controlled reversing of rotor direction while still only requiring two slotted optical switches to sense rotor position.

2. Co-axial Alternators. No additional benefits other than a slightly higher efficiency and lower ripple voltage if the output of the alternator is being rectified to provide a direct current power supply.

VARIATIONS

In all of these examples the wound poles are formed on one or the other of the rotor or the stator and the permanent magnetic poles are provided on the remaining one of the stator or the rotor. However it is possible to provide other configurations, e.g. the rotor may be provided with a band of permanent magnetic poles then a band of wound poles (which may be repeated along its length) and the stator is provided with the opposite configuration so that a band of wound poles on the stator face the band of permanent magnetic poles on the rotor, and a band of permanent magnetic poles on the stator face the band of wound poles on the rotor.

The absence of iron in the substrate adjacent the gap and the plurality of permanent magnetic poles allows the flux path from pole to adjacent pole to be relatively shallow so that a composite motor or composite generator/alternator could be built up with a cylindrical stator within an annular cylindrical rotor which in turn is within an annular cylindrical stator (etc.).

Finally it will be appreciated that various other alterations or modifications may be made to the foregoing without departing from the spirit and scope of this invention has exemplified by the following claims.

I claim:

1. A permanent magnet rotary dynamo electric machine, comprising
   (a) at least one cylindrical stator;
   (b) at least one external cylindrical rotor rotatable about an axis and having an interior cylindrical surface surrounding said stator and spaced apart therefrom by a cylindrical gap;
   (c) a plurality of permanent magnetic poles on said interior cylindrical surface of the rotor and closely spaced interiorly of the rotor and positioned adjacent said cylindrical gap;
   (d) said stator having a plurality of wound poles on a substrate with said wound poles being positioned adjacent said cylindrical gap and being of shallow depth relative to the distance between circumferentially adjacent permanent magnetic poles;
   (e) the configuration of said plurality of permanent magnetic poles about the rotor being such that there are relatively short magnetic flux paths between circumferentially adjacent permanent magnetic poles; and
   (f) the substrate of the stator and said cylindrical gap having both a relative magnetic permeability of less than 20 relative to air and being substantially non-conducting.

2. A permanent magnet rotary dynamo electric machine as claimed in claim 1, wherein the rotor has an end face to which a substantially central drive shaft is attached, said drive shaft being rotatably mounted within the stator.

3. A permanent magnet rotary dynamo electric machine as claimed in claim 2, wherein said plurality of permanent magnetic poles comprises at least 12 permanent magnetic poles spaced substantially evenly around the circumference of the rotor.

4. A permanent magnet rotary dynamo electric machine as claimed in claim 3, wherein said plurality of permanent magnetic poles comprises approximately 20 permanent magnetic poles spaced evenly around the circumference of the rotor.

5. A permanent magnet rotary dynamo electric machine as claimed in claim 1, wherein the permanent magnetic poles comprise a plurality of high strength bar magnets mounted adjacent one another with their axes parallel to the axis of the said rotor.

6. A permanent magnet rotary dynamo electric machine as claimed in claim 5, wherein the permanent magnetic poles comprise a single ring magnet which is magnetized to provide said single ring magnet with regions of alternate magnetic polarity.

* * * * *